United States Patent
Scouten

(10) Patent No.: US 9,515,854 B2
(45) Date of Patent: *Dec. 6, 2016

(54) SYSTEM AND METHOD FOR AC COUPLING

(71) Applicant: CORTINA SYSTEMS, INC., Santa Clara, CA (US)

(72) Inventor: Shawn Lawrence Scouten, Ottawa (CA)

(73) Assignee: Cortina Systems, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/754,038

(22) Filed: Jun. 29, 2015

(65) Prior Publication Data

US 2015/0304135 A1 Oct. 22, 2015

Related U.S. Application Data

(63) Continuation of application No. 13/706,922, filed on Dec. 6, 2012, now Pat. No. 9,083,574.

(51) Int. Cl.
*H03K 3/00* (2006.01)
*H04L 25/02* (2006.01)

(52) U.S. Cl.
CPC ....... *H04L 25/0276* (2013.01); *H04L 25/0292* (2013.01)

(58) Field of Classification Search
None
See application file for complete search history.

(56) References Cited

U.S. PATENT DOCUMENTS

| 5,287,062 A | * 2/1994 | Pellegrin ........... G01R 15/06 324/510 |
| 5,646,569 A | 7/1997 | Bruhns et al. |
| 6,107,882 A | 8/2000 | Gabara et al. |

(Continued)

FOREIGN PATENT DOCUMENTS

WO    WO 2011/121658 A1 * 10/2011    ............ H03H 7/01

OTHER PUBLICATIONS

International Search Report for PCT Patent Application No. US2013/073381 dated Apr. 25, 2014, 16 pages.

(Continued)

*Primary Examiner* — Long Nguyen
(74) *Attorney, Agent, or Firm* — Amin, Turocy & Watson, LLP

(57) ABSTRACT

An AC coupling circuit is provided that has a level shifter circuit having a p input voltage and an n input voltage and producing a p output voltage and a p output voltage. There is a common mode voltage adjustment feedback circuit configured to cause a common mode voltage output to tend towards a specified reference voltage, the common mode voltage output being an average of the p output and n output voltages of the level shifter circuit. In combination, the level shifter circuit and the feedback circuit allow the interconnection of a first circuit that operates at a first, unspecified, common mode voltage to be connected to a second circuit having a required common mode voltage. The level shifter may be formed of adjustable components such that the frequency response of the level shifter circuit can be adjusted to compensate for a frequency response of an interconnect between the first circuit and the second circuit.

14 Claims, 4 Drawing Sheets

(56) References Cited

U.S. PATENT DOCUMENTS

| | | | |
|---|---|---|---|
| 6,292,031 B1 | 9/2001 | Thompson et al. | |
| 7,417,484 B1 | 8/2008 | Voo | |
| 2006/0151851 A1 | 7/2006 | Pillai et al. | |
| 2008/0309395 A1 | 12/2008 | Kaneko et al. | |
| 2009/0067545 A1 | 3/2009 | Chu | |
| 2012/0043968 A1* | 2/2012 | Kojima | G01R 31/2851 324/537 |
| 2012/0133414 A1* | 5/2012 | Zhuang | H03K 3/356113 327/333 |
| 2013/0027238 A1* | 1/2013 | Acharya | G01R 19/2503 341/155 |

OTHER PUBLICATIONS

Notice of Allowance for U.S. Appl. No. 13/706,922, dated Mar. 10, 2015, 14 pages.

Office Action for U.S. Appl. No. 13/706,922, dated May 9, 2014, 10 pages.

Office Action for U.S. Appl. No. 13/706,922, dated Oct. 30, 2014, 8 pages.

Palermo, Sam "Lecture 18: RX FIR & CTLE Equalization, ECEN689: Special Topics in High-Speed Links Circuits and Systems, Spring 2010", Analog & Mixed-Signal Center, Texas A&M University, 2010.

* cited by examiner

SYSTEM AND METHOD FOR AC COUPLING

CROSS-REFERENCE TO RELATED APPLICATION

This application is a continuation of U.S. patent application Ser. No. 13/706,922 filed on Dec. 6, 2012, the contents of which are incorporated in their entirety herein by reference.

FIELD

The application relates to AC (alternating current) coupling mechanisms for interfaces.

BACKGROUND

When transmitting a high data rate signal over an interface from a first chip or circuit with a first DC (direct current) bias or common mode voltage, to a second chip or circuit with a second DC bias or common mode voltage, DC blocking capacitors, also referred to as AC coupling capacitors, are used to isolate the DC behaviour on either side of the interface. Most high speed (e.g. 5 GHz plus) circuits are AC coupled, with board level capacitors. DC blocking capacitors between parts use board area, and degrade signal quality.

An example of a conventional off-chip AC coupling scheme is shown in FIG. 1. Shown is a first circuit 10 connected to a second circuit 14 through board level AC coupling circuit 12 including board level capacitors 16. Also shown is an interconnect 18 that typically has a voltage drop as a function of frequency. In conventional systems, this can be compensated for using an equalizer; however, active equalizers consume a significant power.

SUMMARY

According to one aspect of the present invention, there is provided an AC coupling circuit comprising: a level shifter circuit having a p input voltage and an n input voltage and producing a p output voltage and a p output voltage; a common mode voltage adjustment feedback circuit configured to cause a common mode voltage output to tend towards a specified reference voltage, the common mode voltage output being an average of the p output and n output voltages of the level shifter circuit.

In some embodiments, the level shifter circuit comprises an RC (resistor capacitor) network.

In some embodiments, the RC network comprises a first RC network that produces the p output voltage and a second RC network that produces that n output voltage.

In some embodiments, the first RC network comprises a first resistor divider in parallel with a first capacitor divider; the second RC network comprises a second resistor divider in parallel with a second capacitor divider.

In some embodiments, the level shifter circuit comprises adjustable components such that a frequency response of the level shifter circuit can be adjusted by adjusting the adjustable components.

In some embodiments, the RC network comprises adjustable resistors and adjustable capacitors such that a frequency response of the RC network can be adjusted by adjusting the adjustable resistors and adjustable capacitors.

In some embodiments, the resistors and capacitors are adjusted such that the frequency response of the level shifter circuit level shifter circuit cancels out at least part of another frequency response.

In some embodiments, the common mode voltage adjusting feedback circuit sources current or sinks current through a respective resistor in each of the first and second RC networks.

In some embodiments, the first RC network comprises a first resistor divider in parallel with a first capacitor divider; the second RC network comprises a second resistor divider in parallel with a second capacitor divider; and the respective resistor in each of the first and second RC networks is a respective first resistor in each of the first and second resistor dividers.

In some embodiments, the common mode voltage adjusting feedback circuit comprises: a comparator that compares the common mode output voltage to the reference voltage and produces an output based on the comparison; a filter that filters the output of the comparator to produce a filtered output; a digital to analog converter that receives the filtered output and produces a control signal.

In some embodiments, the common mode voltage adjusting feedback circuit comprises an analog feedback loop.

In some embodiments the common mode voltage adjusting feedback circuit comprises at least one current source the control signal is for the at least one current source.

In some embodiments, the at least one current source comprises a first pull-up current source and a first pull-down current source each connected to the first RC network, and a second pull-up current source and a second pull-down current source each connected to the second RC network.

In some embodiments, at any instant, either: the first pull-up current source sources current through a resistor in the first RC network, and the second pull-up current source sources current through a resistor in the second RC network; or the first pull-down current source sinks current through a resistor in the first RC network, and the second pull-down current source sinks current through a resistor in the second RC network.

In some embodiments, the first pull-up current source and the first pull-down current source both form part of a first sourcing and sinking current source;

and the second pull-up current source and the second pull-down current source each form part of a second sourcing and sinking current source.

In some embodiments there is provided an integrated circuit comprising the AC coupling circuit of any one of the methods summarized above, or detailed below In some embodiments, the reference voltage is set to equal a common mode voltage suitable for input to a remainder of the integrated circuit.

In another aspect of the present invention, there is provided a method of AC coupling: performing level shifting with a level shifter circuit having a p input voltage and an n input voltage and producing a p output voltage and a p output voltage; using a feedback circuit to cause a common mode voltage output to tend towards a specified reference voltage, the common mode voltage output being an average of the p output and n output voltages of the level shifter circuit.

In some embodiments, the method further comprises: adjusting at least one adjustable component in the level shifter circuit to adjust a frequency response of the level shifter circuit.

In some embodiments, the method comprises adjusting at least one adjustable component in the level shifter circuit to adjust a frequency response of the level shifter circuit to cancel out at least part of a frequency response of an interconnect between a first circuit and a second circuit, the level shifter circuit and the feedback circuit both forming part of the second circuit.

DETAILED DESCRIPTION

Figure 1:
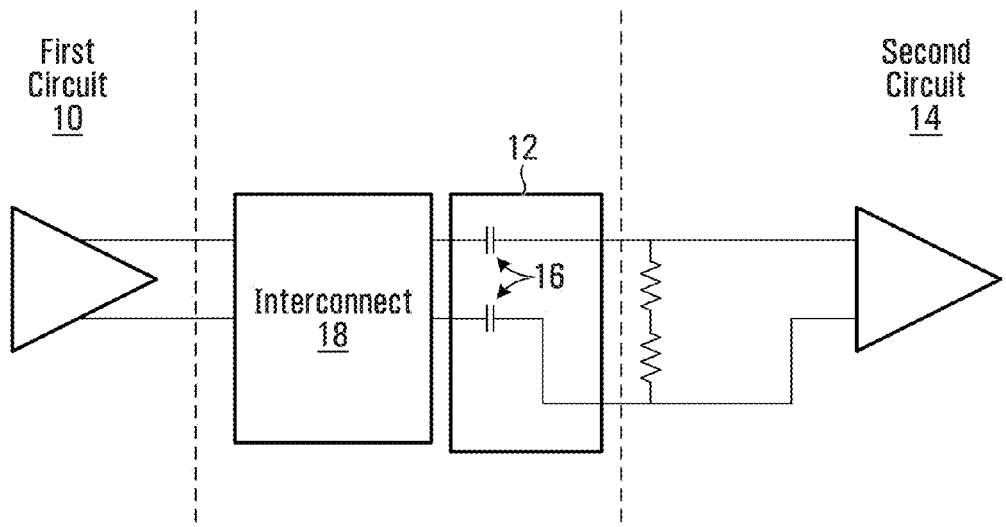
FIG. 1 is a block diagram of a conventional AC coupling circuit.
Figure 2:
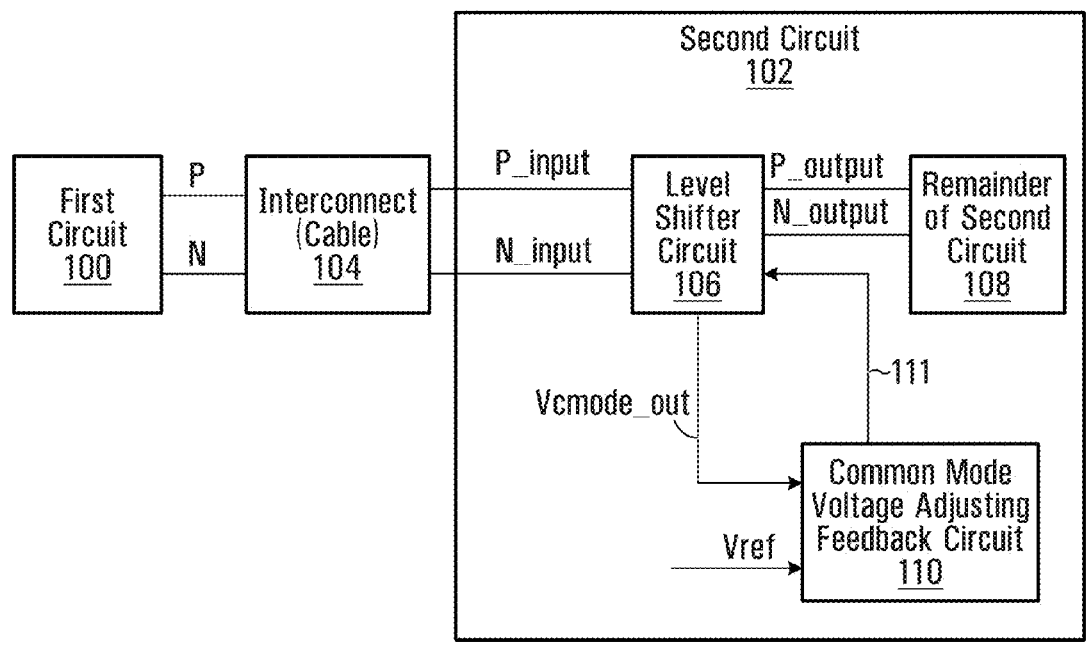
FIG. 2 is a block diagram of a system featuring an AC coupling circuit provided by an embodiment of the invention.

Referring now to FIG. 2, shown is a system featuring an AC coupling circuit provided by an embodiment of the invention. There is a first circuit 100 connected to a second circuit 102 through an interconnect 104. Each of the first and second circuit may, for example, be an integrated circuit, for example an ASIC (application specific integrated circuit), FPGA (field programmable gate array), or a circuit that implements a high speed electrical link. Interconnect 104 may be a cable, circuit board trace etc. The second circuit includes an AC coupling circuit comprised of a level shifter circuit 106 and a common mode voltage adjusting feedback circuit 110. The remainder of the second circuit 102 is indicated at 108. The level shifter circuit 106 receives inputs P_input and N_input via the interconnect 104, and produces equalized P and N outputs P_output, N_output as shown, which are passed on to the remainder of the second circuit 108. The level shifter circuit 106 also produces a common mode output voltage vcmode_out which is the average of the outputs P_output and N_output. The common mode output voltage is connected as a first input to the common mode voltage adjusting feedback circuit 110. The second input of the common mode voltage adjusting feedback circuit 110 is a reference voltage Vref. The common mode voltage adjusting feedback circuit 110 has an output 111 that is connected to the level shifter circuit 106 so as to have an effect upon the common mode output voltage vcmode_out. The first circuit 100 may be a first chip and the second circuit 102 may be a second chip, in which case the level shifter circuit and the common mode voltage adjusting circuit form part of the second chip and can be referred to as being "on-chip".

In operation, the level shifter circuit 106 introduces a shift in the common mode output voltage vcmode_out relative to a common mode voltage at the input. In some embodiments, the level shifter circuit 106 has a transfer function that implements a specified frequency response, for example a frequency response that compensates for, or cancels out, at least some of a frequency response introduced by the interconnect 104. In some embodiments, the components are adjustable such that the frequency response can be adjusted. The output of the common mode voltage adjusting feedback circuit 110 has the effect of causing the common mode output voltage vcmode_out to tend towards Vref, irrespective of the input common mode voltage, which is the average of P_input and N_input. In a specific example, the common mode voltage adjusting feedback circuit 110 sources current through resistors in the level shifter circuit 106 or sinks current through resistors in the level shifter circuit 106 so as to adjust the vcmode_out relative to vcmode_in so as to tend towards Vref. The common mode voltage adjusting feedback circuit 110 may include a digital feedback loop or an analog feedback loop, for example.

Figure 3:
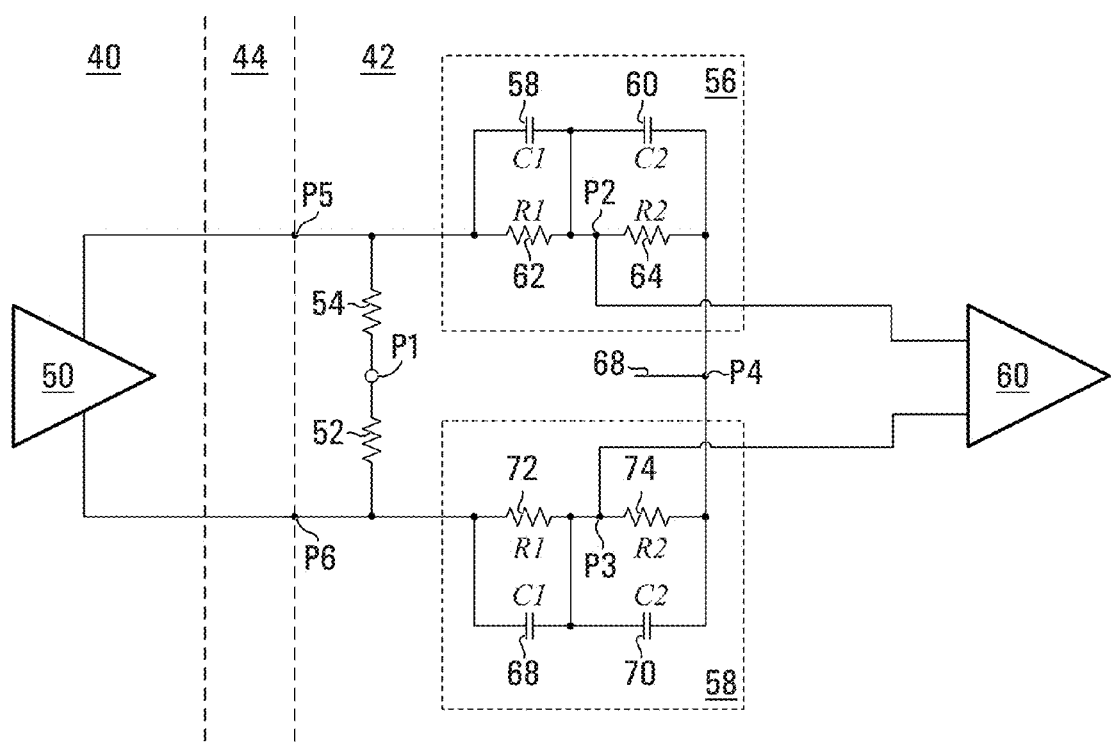
FIG. 3 is a circuit diagram of a level shifter circuit.

A specific implementation of the system of FIG. 2 will now be described with reference to FIG. 3 which shows an example implementation of a level shifter circuit, and FIG. 6 which shows an example implementation of a common mode voltage adjusting feedback circuit. Referring first to FIG. 3, shown is a first circuit 40 having p and n outputs that are connected to p and n inputs at points P5,P6 of a second circuit 42 through a cable 44. In the illustrated example, the first circuit 40 is shown to include an output driver 50, but may include additional or different functionality specific to the first circuit. The second circuit 42 is shown to include a limiting amplifier 60, but may include additional, or different functionality, specific to the second circuit. This might, for example, include an active equalizer or direct drive of a CDR (clock and data recovery) circuit.

At the input to the second circuit, there are two resistors 52,54. Resistors 52,54 may, for example, be 50 ohm termination resistors for the high speed transmission interconnect. A different impedance for these resistors is possible, but 50 ohms is most common. 75 ohms is also common for cable applications. The common mode voltage vcmode_in at the input to the second circuit 42 is the voltage at point P1, this also being equal to the common mode voltage at the output of the first circuit 40.

Shown is a level shifting circuit that includes a network 56 for the p input, and a network 58 for the n input. The network 56 for the p input comprises a resister divider formed of resisters 62,64 having respective resistances R1 and R2. The resistor divider is in parallel with a capacitor divider formed of capacitors 58,60, having respective capacitances C1 and C2.

The network 58 for the n input comprises a resister divider formed of resisters 72,74 having respective resistances R1 and R2. The resistor divider is in parallel with a capacitor divider formed of capacitors 68,70, having respective capacitances C1 and C2.

The double sided output of the level shifter circuit, which functions as the input to the remainder of the second circuit, includes a P output from network 56 at point P2 and an N output from network 58 at point P3. The common mode voltage of the output of the level shifter circuit, vcmode_out, is available at point P4. The voltage vcmode_out is the average value of the P and N signals.

The use of the resister divider in parallel with the capacitor divider (referred to hereinafter as an RC divider) allows direct DC coupling between circuits. The circuit allows two different common modes to be connected, while passing a band of interest. The RC divider can tolerate the same DC voltages as board mounted AC coupling capacitors. In addition, the RC divider can be configured to be broad-band, having a wider pass band than board mounted AC coupling capacitors.

It is noted that the resistors in the RC divider have the additional benefit of not allowing high voltage to reach the remainder of the second circuit, e.g. the input to the limiting amplifier 60 which may be, for example, a sensitive transistor gate.

The cable 44 (or other interconnect) may have a voltage drop as a function of frequency. By adjusting the component values R1,R2,C1 and C2, an equalization function is realized with no extra power consumption.

In some embodiments, all four components R1,R2,C1 and C2 are adjustable components, for example register controlled resistances and register controlled capacitances. A register controlled resistance, for example, be a set of resistances in series that can be switched in or out; similarly, register controlled capacitance may, for example, be a set of capacitors in parallel that can be switched in or out. In some embodiments, one or more of the resistors are implemented using MOSFET channels. This is another way of making an adjustable resistor.

Through proper selection of the programmable components, R1,R2,C1,C2 at least some of the voltage drop due to cable 44 as a function of frequency over at least some of the bandwidth of interest can be cancelled. Advantageously, with the circuit shown, the frequency response is a function of ratios of component values, and therefore does not depend on the process used to implement the resistors or capacitors.

The RC divider behaves like the combination of a low pass filter based on resistors and a high pass filter based on capacitors. At low frequency, capacitors behave like open circuit, and two resistors behave like a voltage divider. The DC gain can be expressed as follows:

$$DC\ gain = R2/(R1+R2).$$

At high frequency, the capacitors dominate, and the high frequency gain can be expressed as follows:

$$HFgain = C1/(C1+C2)$$

Appropriate setting of the component values can set the relative gain at high frequency compared to DC. For example, assuming R1 and R2 are set such that R2/(R1+R2) =.5, and C1 and C2 are set such that C1/(C1+C2)=0.8, the overall effect will be gain in the high frequency relative to low frequency.

Figure 4:
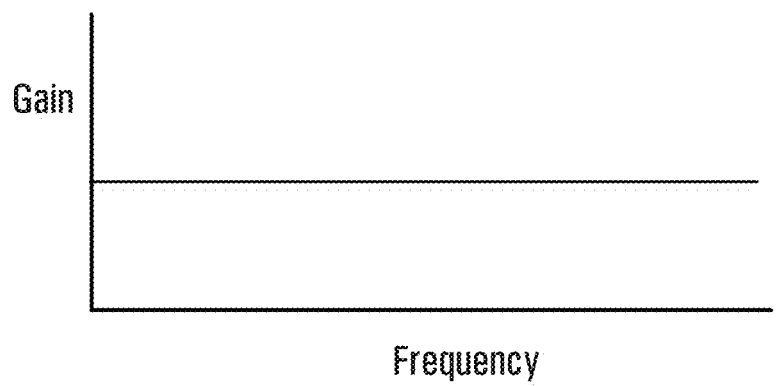
FIGS. 4 and 5 are plots of transfer characteristics of the level shifter circuit of FIG. 3.
Figure 5:
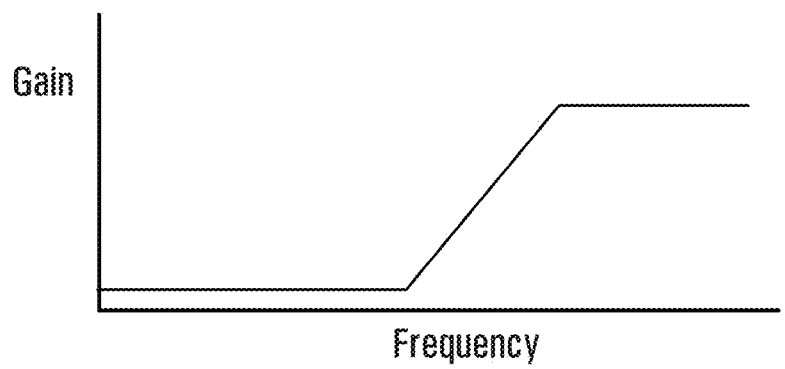

Example frequency responses are depicted in FIGS. 4 and 5. In FIG. 4, R2/R2 is equal to C1/C2 with the result there is a wideband flat frequency response. In FIG. 5, R2/R2 is less than C1/C2 with the result there is an equalizing frequency response.

Figure 6:
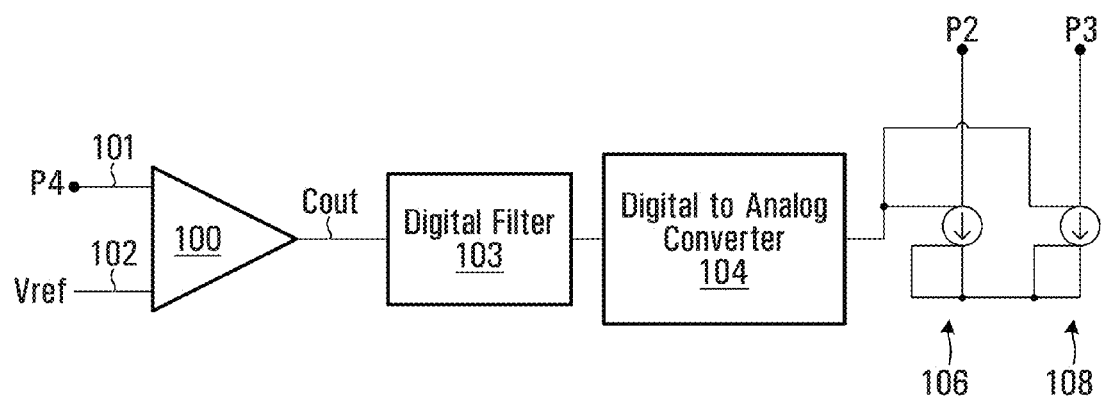
FIG. 6 is a circuit diagram of a common mode voltage adjusting feedback circuit.

Referring now to FIG. 6, shown is an example of the common mode voltage adjusting feedback circuit that sets the common mode voltage output of the level shifter circuit of FIG. 3 to a desired reference value, Vref. Shown is a comparator 100 having a first input 101 that is the common mode voltage vcmode_out output by the RC divider (i.e. the voltage taken at point P4 of FIG. 3), and having a second input 102 that is set to a reference voltage input Vref which is the desired common mode voltage. The output of the comparator 100 is input to a digital filter 103. The output of the digital filter is connected to a DAC (digital to analog converter) 104. The DAC produces an output that is connected to a first current source 106 and a second current source 108. The first current source 106 is a sourcing and sinking current source that both sources and sinks current, and is connected to point P2 of FIG. 3. The first current source may be comprised of a sourcing current source and a sinking current source. The second current source 108 is a sourcing and sinking current source that both sources and sinks current, and is connected to point P3 of FIG. 3. The second circuit source may be comprised of a sourcing current source and a sinking current source.

In operation, the comparator 100 produces an output that is a function of the difference between vcmode_out and Vref. In a specific example, it produces a digital output Cout that is either a 1 or a 0 (or +1/−1). For example, vcmode_out>VRef, Cout=+1 (or 1), and when vcmode_out<VRef, Cout=0 (or −1).

This comparator output is input to the digital filter 103 which behaves like an integrator, and has the effect of smoothing the output of the comparator. This is so adjustment happens slowly at a frequency that is below the band of the data going through. The output of the digital filter 103 may still a 1 or a 0, (or +1/−1), but transitions are much slower compared to those on the input to the digital filter.

The DAC 104 receives the filtered comparator output and produces an output voltage that controls the two current sources 106, 108. When the filtered comparator output is a 1, the DAC output is incremented (for example by one), and when the filtered comparator output is a 0 (or −1), the DAC output is decremented (for example by one). The two current sources 106, 108 drive the same values, with one going to point P2, and the other going to point P3.

The tendency of the feedback circuit is to make the differential at the input to the comparator 100 go to zero, or equivalently to make vcmode_out move towards Vref.

As noted above, the two current sources 106,108 each have a current sink, also referred to as a pull-down current source and a current source, also referred to as a pull-up current source function. Because the same input is connected to the current sources, the two pull-down current sources always sink equal currents, and the two pull-up current sources always source equal currents. However, only one of current sourcing and current sinking is happening at any given time. Thus, at a given instant, one of the following two situations exist:

Current sinking: current source 106 is sinking current through resistor 62 having resistance R1, and current source 108 is sinking current through resistor 72 having resistance R1; or Current sourcing: current source 106 is sourcing current through resistor 62, and current source 108 is sourcing current through resistor 72.

The common mode voltage at inputs P5,P6 is set by the driver on the first circuit 40. The common mode output of the RC divider is set by the feedback current sourced or sunk through resistors 62,72. The current through resistors 62,72 is adjusted until vcmode_out is the right value, namely Vref.

Sourcing current through resistors 62,72 has the effect of increasing vcmode_out relative to vcmode_in, while sinking current through resistors 62,72 has the effect of decreasing vcmode_out relative to vcmode_in.

The AC coupling circuits described may, for example, be used in applications where serdes (serializer-deserializer) are used. For example, they may be used in OTN (optical transport network), PON (passive optical networks), Ethernet.

Numerous modifications and variations of the present disclosure are possible in light of the above teachings. It is therefore to be understood that within the scope of the appended claims, the disclosure may be practiced otherwise than as specifically described herein.

What is claimed is:

1. A serializer-deserializer integrated circuit device, the device comprising:
   an interface circuit comprising an AC coupling circuit, the AC coupling circuit comprising:
      a level shifter circuit having an input and an output, the level shifter circuit comprising a resistor divider in parallel with a capacitor divider; the input of the level shifter being configured for receiving a p input voltage and an n input voltage, the output of the level shifter circuit being configured for producing a p output voltage and an n output voltage; and
      a common mode voltage adjustment feedback circuit configured to cause a common mode voltage output to tend towards a specified reference voltage, the common mode voltage output being an average of the p output and n output voltages of the level shifter circuit.

2. The device of claim 1 wherein at least one of the resistor divider and the capacitor divider is adjustable to adjust a frequency response of the level shifter circuit.

3. The device of claim 1 wherein both the resistor divider and the capacitor divider are adjustable to adjust a frequency response of the level shifter circuit.

4. The device of claim 3 wherein the resistor divider and the capacitor divider are adjusted such that the frequency response of the level shifter circuit cancels out at least part of another frequency response.

5. The device of claim 1 wherein the level shifter circuit further comprises a second resistor divider in parallel with a second capacitor divider.

6. The device of claim 5 wherein the first resistor divider in parallel with the first capacitor divider produces the p output voltage and the second resistor divider in parallel with the second capacitor divider produces the n output voltage.

7. The device of claim 1 wherein the common mode voltage adjustment feedback circuit sources current or sinks current through a first resistor in the resistor divider.

8. The device of claim 1 wherein the common mode voltage adjustment feedback circuit comprises:
a comparator that compares the common mode output voltage to the reference voltage and produces an output based on the comparison;
a filter that filters the output of the comparator to produce a filtered output;
a digital to analog converter that receives the filtered output and produces a control signal.

9. The device of claim 1 wherein:
the common mode voltage adjustment feedback circuit comprises an analog feedback loop and at least one current source;
the analog feedback loop produces a control signal for the at least one current source.

10. The device of claim 9 wherein the at least one current source comprises a pull-up current source and a pull-down current source each connected to the resistor divider.

11. The device of claim 10 wherein at any instant, either:
the pull-up current source sources current through a resistor in the resistor divider, or
the pull-down current source sinks current through a resistor in the resistor divider.

12. The device of claim 10 wherein:
the pull-up current source and the pull-down current source both form part of a sourcing and sinking current source.

13. The device of claim 1 wherein the reference voltage is set to equal a common mode voltage suitable for input to a remainder of the device.

14. A method for operating an integrated circuit, the method comprising AC coupling comprising:
performing level shifting with a level shifter circuit having an input and an output, the level shifter circuit comprising a resistor divider in parallel with a capacitor divider;
adjusting at least one adjustable component in the level shifter circuit to adjust a frequency response of the level shifter circuit,
wherein:
adjusting at least one adjustable component in the level shifter circuit comprises adjusting at least one of the resistor divider and the capacitor divider to adjust a frequency response of the level shifter circuit;
the input of the level shifter is for receiving a p input voltage and an n input voltage;
the output of the level shifter circuit is for producing a p output voltage and an n output voltage; and
the method further comprises using a feedback circuit to cause a common mode voltage output to tend towards a specified reference voltage, the common mode voltage output being an average of the p output and n output voltages of the level shifter circuit.

* * * * *